United States Patent Office 3,428,940
Patented Feb. 18, 1969

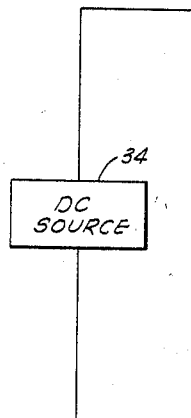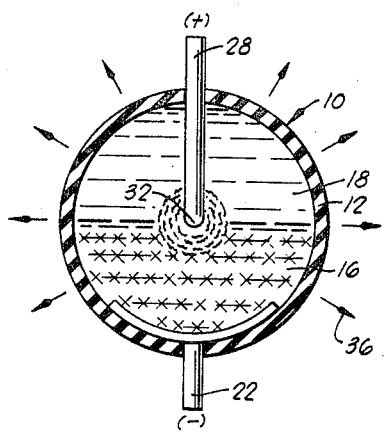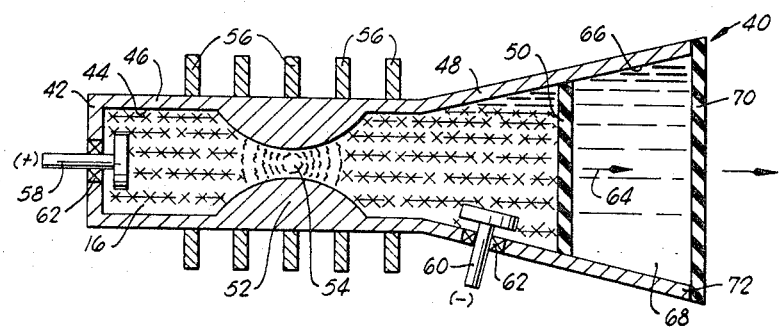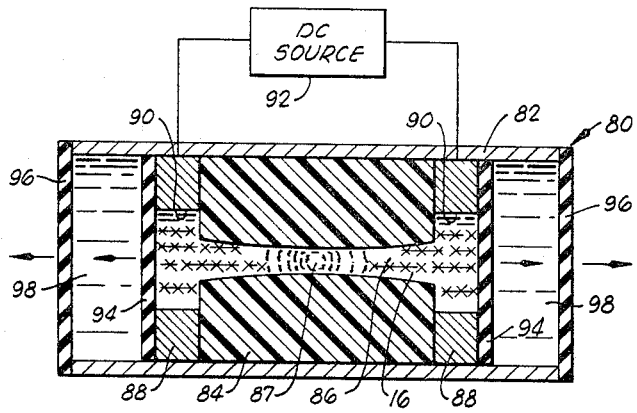

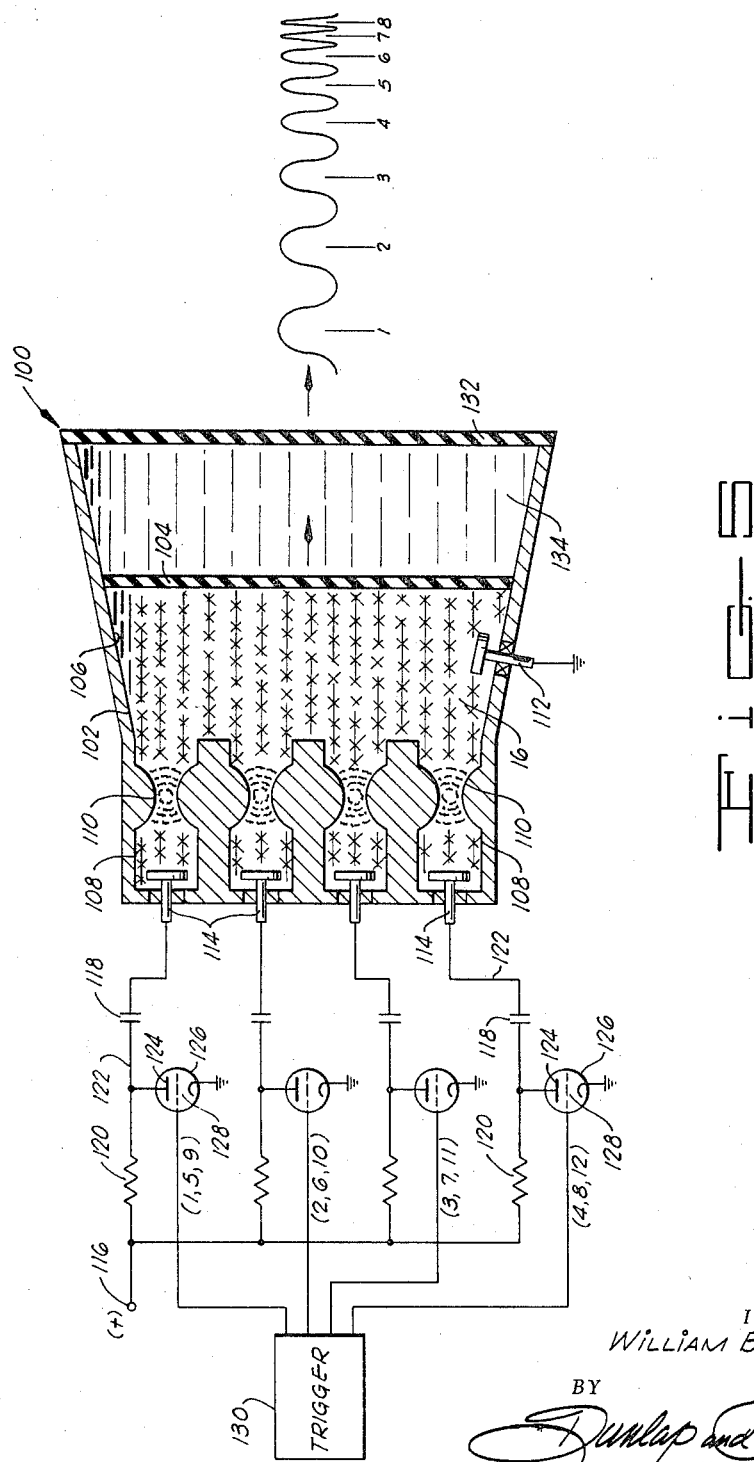

3,428,940
SONIC TRANSMITTER
William B. Huckabay, 4225 Greenbrier,
Dallas, Tex. 75225
Filed Feb. 20, 1967, Ser. No. 617,263
U.S. Cl. 340—12
Int. Cl. H04b *13/02*
13 Claims

ABSTRACT OF THE DISCLOSURE

A sonic transmitter for use in distance measuring utilizing two solid electrodes connected by a liquid metal conductor in such a manner that a minor portion of the liquid metal is converted to a gaseous state when a breakdown potential is imposed across the solid electrodes to generate sonic waves, and the liquid metal is contained to promptly recomplete the circuit between the solid electrodes for a subsequent cycle of operation.

BACKGROUND OF THE INVENTION

Field of the invention

This invention relates generally to improvements in sonic transmitters useful in distance measuring, and more particularly, but not by way of limitation, to an underwater transmitter of the type utilizing a spark or arc for the generation of sonic waves.

Descripiton of the prior art

Prior underwater transmitters used in distance measuring systems may be broadly classified in two categories.

In one type of underwater transmitter, used primarily in Sonar systems, the transmitting element is either a piezoelectric or magnetostrictive member expanded and contracted by the direct application of electrical energy or magnetic energy to the member. In either event, the amount of expansion and contraction of the member (the controlling factor as to the energy which may be transmitted into the surrounding water) is in the order of a few parts per million. As a result, such members must be made unduly large to obtain an appreciable signal transmission, although the characteristics of the signal which is transmitted may be relatively closely controlled, particularly with respect to the frequency of the transmitted signal.

The other general type of prior underwater transmitters utilizes a pair of solid electrodes maintained in spaced relation in the water—usually sea water. A sufficient potential is momentarily imposed across the electrodes to create a spark or arc and convert either a portion of one of the electrodes or a portion of the sea water between the electrodes to a gaseous state and thereby generate sonic waves in the water. Normally, the electrodes are simply held in spaced relation in the sea water and a portion of one of the electrodes is effectively consumed during each cycle of operation, although it is possible to isolate the explosion from the electrodes by enclosing one of the electrodes in a box having a relatively small aperture therein to provide a high resistance in the sea water portion of the circuit and thus control the point of the explosion and protect the electrodes. In either event, however, tests have shown that such systems are less than ten percent efficient and the frequency of the transmitted signal is not effectively controlled. It should also be noted that it has been known to connect the solid electrodes with a small solid wire, also for the purpose of conserving the electrodes, but the small wire is destroyed with each explosion and must be replaced following each explosion. It is readily apparent that the replacement of the small wire is a time consuming and difficult operation, particularly if performed without retrieving the transmitter from the water.

SUMMARY OF THE INVENTION

The present invention contemplates a sonic transmitter broadly comprising a housing constructed of nonconductive material and which may be adapted to be immersed in a body of water. The housing contains a chamber having at least one wall thereof, which separates the chamber from the water or other medium through which sound is to be transmitted, formed of an elastic material. A pair of solid electrodes are secured in the chamber is spaced relation and a body of liquid metal is contained in the chamber in contact with both of the solid electrodes in at least one position of the housing to form a conductor between the solid electrodes. Finally, the transmitter includes a source of electrical energy connected to the solid electrodes and being of a size to impose sufficient potential across the electrodes to momentarily change the state of a portion of the body of liquid metal to a gas, such that the elastic wall of the housing is expanded outwardly and a sonic wave is generated in the surrounding water or other medium. In a more limited aspect of the invention, the chamber is constructed to provide a section between the solid electrodes which is of reduced cross-sectional area to locate the portion of the liquid metal which is momentarily converted to a gas; that is, control the point of the explosion, and thereby further protect the solid electrodes. Immediately following an explosion, the gas is reconverted to liquid metal and the circuit between the solid electrodes is again established for a subsequent cycle of operation.

An object of the invention is to increase the efficiency of sonic transmitters used in distance measuring.

Another object of the invention is to provide a sonic transmitter which may be made of moderate size and yet which will produce sonic waves of appreciable energy.

A further object of this invention is to provide a sonic transmitter which may be used in various types of distance measuring operations.

Another object of this invention is to provide a sonic transmitter which will produce acoustic signals of controlled frequency.

A still further object of this invention is to provide an underwater transmitter which is economical in construction and operation and which need not be retrieved between transmissions.

Other objects and advantages of the invention will be evident from the following detailed description when read in conjunction with the accompanying drawings which illustrate various embodiments of the invention.

BRIEF DESCRIPTION OF THE DRAWING

FIG. 1 is a schematic, vertical sectional view of one embodiment of my invention in position for firing.

FIG. 2 is a view similar to FIG. 1 schematically illustrating the conditions of the device during firing.

FIG. 3 is a schematic, vertical sectional view through a modified embodiment of the invention.

FIG. 4 is a schematic, vertical sectional view through another embodiment of the invention.

FIG. 5 is a schematic, vertical sectional view through still another embodiment of the invention, including a schematic wiring diagram and a schematic illustration of the transmitted signal.

DESCRIPTION OF FIGS. 1 AND 2 EMBODIMENT

As shown in FIG. 1, this form of underwater transmitter 10 comprises a hollow ball 12 of elastic material, such as rubber or neoprene, forming a chamber 14 therein. A body 16 of a conductive, liquid metal partially fills the chamber 14, and the remainder of the chamber 14 is filled with a nonconductive liquid 18, thereby providing an interface 20 at an intermediate portion of the chamber 14. The liquid metal 16 may be any conductive metal which is in a liquid state at atmospheric temperature and pressure, and is preferably mercury, although any such liquid metal may be used, such as Woods metal or a gallium alloy. It may also be noted that the liquid metal 16 will be heavier than the nonconductive liquid 18 (which may be, for example, water) such that the liquid metal 16 will gravitate to the lower portion of the chamber 14 and a marked interface 20 will be present when the transmitter 10 is in a quiescent position in a body of water.

A first solid electrode 22 extends through an aperture 24 in the bottom of the ball 12 and is suitably secured to the ball 12 to prevent the leakage of fluid between the electrode and the walls of the aperture 24. A curved plate 26 may be formed on the inner end of the electrode 22 of the same material as the electrode 22 to increase the area of contact between the liquid metal 16 and the electrode 22, if desired. The electrode 22 is formed of any desired material which will withstand the sea water environment in which the transmitter 10 will normally be used and may be, for example, formed of a carbon composition or a conductive metal.

A second electrode 28 extends through a mating aperture 30 formed in the top of the ball 12 and is suitably secured and sealed in the aperture 30 to prevent the leakage of fluid through such aperture. The electrode 28 is of such a length that the lower or inner end 32 thereof pierces the interface 20 in the upright and quiescent position of the transmitter 10, with the end 32 of the electrode 28 projecting slightly into the upper surface of the liquid metal 16.

A suitable source 34 of direct current energy is connected across the electrodes 22 and 28 to impose a momentary breakdown potential across such electrodes, as is well known in the art of sparker-type underwater transmitters.

The transmitter 10 may be supported in any desired manner from a vessel, such that the transmitter 10 will, with the exception of the power source 34, be immersed in a body of water, the primary requirement being that the transmitter 10 be supported in such a manner that it will either remain in the upright position as illustrated in FIG. 1, or will be returned to such an upright position promptly following the transmission of acoustic energy by the transmitter.

The liquid metal 16 forms a conductor between the solid electrodes 22 and 28 when the transmitter 10 is in an upright position as shown in FIG. 1. It will be noted, however, that by virtue of the enlarged inner end 26 of the electrode 22 and the position of the electrode 28, the highest resistance section of the circuit will be at the interface between the inner end 32 of the electrode 28 and the liquid metal 16 adjacent thereto. Therefore, when a large potential, such as 5,000 volts, is imposed across the electrodes by the source 34, breakdown will occur at or adjacent the inner end 32 of the electrode 28. When such breakdown occurs, a portion of the liquid metal 16 at the inner end 32 of the electrode 28 will be converted to a highly ionized gas. As schematically illustrated in FIG. 2, the highly ionized gas will expand rapidly and the force of such expansion is transmitted through the liquid metal 16 and the nonconductive liquid 18 to rapidly expand the ball 12 as indicated by the arrows 36 in FIG. 2. The rapid expansion of the ball 12 generates a sonic wave in the body of water in which the transmitter 10 is immersed and such sonic wave may be used as the transmitted signal in any desired type of distance measuring system.

As soon as the energy of the expanding gas in the center of the ball 12 dissipates, such gas will contract and be reconverted to a liquid state. Thus, the ball 12 will contract back to the form shown in FIG. 1, and with the transmitter 10 in an upright position as shown in FIG. 1, the transmitter will be in condition for another cycle of operation.

The breakdown of the liquid metal 16 into a highly expanding conductive gas is at least similar to the breakdown of sea water or a small wire connecting two electrodes in the previous sparker or arcer type transmitters discussed above, and is usually referred to as a plasmic explosion. Thus, the transmitter 10 is capable of generating acoustic signals in a body of water of sufficient power for use in a seismic surveying system investigating lithology many thousands of feet below the body of water. Further, the efficiency of conversion of power provided by the source 34 is appreciably increased over sparker or arcing type systems wherein electrodes are connected only by seawater.

DESCRIPTION OF FIG. 3 EMBODIMENT

The transmitter 40 shown in FIG. 3 comprises a housing 42 formed of a nonconductive metal, such as an aluminum oxide, to form a chamber 44 containing a body of the liquid metal 16. The housing 42 includes a substantially cylindrical section 46 housing the major portion of the chamber 44, and a section 48 of increasing diameter. An elastic material wall 50 formed, for example, of rubber or neoprene, is suitably secured across an intermediate portion of the housing section 48 to form one end of the chamber 44. It should also be observed that a portion 52 of the housing section 46 is reduced in inner diameter to provide a limited portion 54 of the chamber 44 of reduced cross-sectional area, for purposes to be described. Further, a plurality of heat radiating fins 56 may be secured around the housing section 46 outwardly of the reduced diameter portion 54 of the chamber 44, if desired.

Solid electrodes 58 and 60 are secured in the opposite end portions of the chamber 44, with each electrode being extended through the adjacent wall of the housing 42 and suitably sealed in such wall by a seal 62 to prevent the leakage of fluid around either electrode to or from the chamber 44. The liquid metal 16 is of a quantity to completely fill the chamber 44 when the elastic material wall 50 is not expanded, as illustrated in FIG. 3. The electrodes 58 and 60 are connected to a suitable source of direct current energy in the same manner as described above for the embodiment shown in FIGS. 1 and 2.

The liquid metal 16 contacts and forms a conductor between the electrodes 58 and 60, and the reduced cross-sectional area portion 54 of the chamber 44 provides a section of the liquid metal 16 portion of the circuit of increased resistance. Thus, when a breakdown potential is imposed across the electrodes 58 and 60, the breakdown or explosion of liquid metal will occur in the portion 54 of the chamber 44 remote from both of the electrodes to minimize the possibility of the electrodes 58 and 60 being consumed by the operation.

The resulting highly expanding conductive gas forces the liquid metal 16 in opposite directions from the portion 54 of the chamber 44 with the result that the elastic material wall 50 is rapidly forced or expanded in a direction away from the explosion, as indicated by the arrow 64 in FIG. 3.

The elastic material wall 50 may be directly in contact with a body of water in which the transmitter 40 is immersed, but it is preferred to provide an additional chamber 66 in the transmitter communicating with the elastic material wall 50 on the side thereof opposite the chamber 44 containing an acoustic matching liquid 68, such as kerosene or oil. The chamber 66 is enclosed by the walls of the housing 42, the elastic material wall 50 and an elastic material membrane 70 suitably secured across the extreme end portion 72 of the housing. As a result, when the elastic material wall 50 is expanded by the explosion in the chamber 44, the force of such expansion is transmitted through the acoustic matching liquid 68 to expand the membrane 70 which is in contact with the body of water in which the transmitter 40 is immersed to increase the efficiency of transmission of energy from the explosion to the surrounding water.

The heat generated in creating the explosion in the portion 54 of the chamber 44 is at least partially dissipated through the adjacent walls of the housing section 46 and the radiating fins 56 to increase the speed at which the gas formed by the explosion is reconverted to a liquid state. When the gas is reconverted to a liquid state, the elastic material wall 50 and the elastic membrane 70 will contract back to the positions illustrated in FIG. 3 and the liquid metal 16 will again form a circuit between the electrodes 58 and 60 for another cycle of operation.

As in the embodiment of FIGS. 1 and 2, the transmitter 40 will normally be towed or carried in an immersed condition in a body of water by a towing ship through the use of any desired supporting mechanism. The transmitter 40 may be supported in the body of water in any desired position, and by virtue of the fact that the elastic material wall 50 and the elastic membrane 70 are positioned at one end of the transmitter, the transmitter will provide a degree of direction to the acoustic wave generated in the body of water. It will also be understood by those skilled in the art, however, that the membrane 70 could be placed directly in contact with the earth and the sonic wave transmitted directly into the earth in seismic exploration.

DESCRIPTION OF FIG. 4 EMBODIMENT

The transmitter 80 shown in FIG. 4 comprises a sleeve 82 of a nonconductive metal, such as an aluminum oxide, which forms the outer wall of the housing for the transmitter. An insert 84 is suitably secured in the central portion of the sleeve 82 and is formed of nonconductive material, such as aluminum oxide or one of the materials commonly known as plastics, such as Teflon or nylon. The insert 84 has a bore 86 extending axially therethrough to contain a liquid metal 16. The central portion 87 of the bore 86 is preferably reduced in diameter to provide a high resistance section in a manner similar to the portion 54 in the FIG. 3 embodiment described above. Thus, the insert 84 may be considered as a portion of the housing of the transmitter.

Washer-shaped electrodes 88 are secured in the sleeve 82 in contact with the opposite ends of the insert 84. The electrodes 88 are, of course, solid and the bore 90 through each of the electrodes is of a larger diameter than the bore 86 extending through the insert 84, with all of such bores being in communication to form a chamber in the transmitter 80 for containing the liquid metal 16. The electrodes 88 are suitably connected to a source 92 of direct current energy in the same manner as previously described.

An elastic material wall 94, formed of, for example, rubber or neoprene, is suitably secured in the sleeve 82 against the end of each electrode 88 on the side thereof opposite the insert 84, such that the walls 94 complete the enclosure of the chamber formed by the bores 86 and 90. As shown in the drawing, the walls 94 are spaced from the adjacent ends of the sleeve 82, and an elastic material membrane 96 is suitably secured across each end of the sleeve 82 to form secondary chambers 98 in the opposite ends of the transmitter outwardly of the chamber formed by the bores 86 and 90. Each chamber 98 contains an acoustic matching liquid, such as kerosene or oil in a manner similar to the embodiment of FIG. 3 described above.

When the elastic material walls 94 are not expanded as illustrated in FIG. 4, the liquid metal 16 completely fills the bores 86 and 90 and makes contact with both of the electrodes 88 to complete the circuit between the electrodes. However, since the central portion of the bore 86 through the insert 84 is substantially smaller in diameter than the bores 90 of the electrodes 88, that portion of the liquid metal 16 in the central portion of the bore 86 will form a high resistance section for the circuit provided by the liquid metal. Thus, when a breakdown potential is imposed across the electrodes 88 by the source 92, the breakdown or explosion of the liquid metal 16 will occur in the central portion of the bore 86 remote from the electrodes 88, whereby the electrodes 88 will not be consumed by operation of the transmitter.

When the breakdown or explosion occurs in the bore 86, the resulting highly expanding conductive gas forces the remaining liquid metal 16 in opposite directions against the elastic material walls 94 to rapidly expand such walls. The expansion of the walls 94 is transmitted through the acoustic matching liquid in the chambers 98 to expand the elastic membranes 96 which are in contact with the body of water in which the transmitter 80 is immersed. Thus, acoustic waves are generated in the body of water in a manner similar to that previously described.

As soon as the energy of the expanding gas in the bore 86 is dissipated, such gas will contract and be reconverted to liquid metal 16. The elastic material walls 94 and elastic membranes 96 will then contact to the positions illustrated in FIG. 4 and the liquid metal 16 will again complete a circuit between the electrodes 88 for a subsequent cycle of operation.

As in the previously described embodiments, the transmitter 80 will normally be towed or carried through water in an immersed condition by a towing vessel, and the transmitter 80 may be used to generate acoustic signals for any desired type of distance measuring operation.

DESCRIPTION OF FIG. 5 EMBODIMENT

The transmitter 100 shown in FIG. 5 is designed for the purpose of transmitting an acoustic wave train in a body of water in which the transmitter is immersed. The transmitter 100 comprises a hollow housing 102 having an elastic material wall 104 suitably secured across an intermediate portion thereof to form a chamber 106 containing the liquid metal 16. A plurality of hollow extensions 108 are provided at one end of the housing 102 to provide extensions of the chamber 106. An intermediate portion 110 of each extension 108 is reduced in inner diameter to provide a section of reduced cross-sectional area for each extension for purposes to be described.

A first solid electrode 112 is suitably secured in the chamber 106 in spaced relation from the extensions 108 and extends through and is suitably sealed in the adjacent wall of the housing 102 to prevent the leakage of fluid to or from the chamber 106. The electrode 112 may be connected to ground as shown in the drawing.

A second solid electrode 114 is positioned in each extension 108 on the side of the respective restricted section 110 opposite to the elastic material wall 104. Each electrode 114 extends through and is sealed in the adjacent portion of the wall of the housing 102 to also prevent the leakage of fluid to or from the chamber 106 around the respective electrode. Each electrode 114 is connected to a source 116 of direct current energy through a capacitor 118 and limiting resistor 120 interposed in the connecting conductor 122. Each conductor 122, between the respective capacitor 118 and resistor 120, is connected to the plate 124 of a discharge tube 126. The grid 128 of each discharge tube 126 is connected to a suitable trigger 130 for sequentially firing the discharge tubes 126, as will be described.

An elastic material membrane 132 is secured across the end of the housing 102 opposite the extensions 108 to form a second chamber 134 on the side of the elastic material wall 104 opposite the chamber 106. The second chamber 134 contains an acoustic matching liquid in the manner previously described.

When the elastic material wall 104 is not expanded as illustrated in the drawing, the liquid metal 16 completely fills the chamber 106 to make contact between the first electrode 112 and each of the electrodes 114 and thus form a conductor between the first electrode 112 and all of the second electrodes 114. However, the reduced or restricted section 110 of each of the extensions 108 will provide a high resistance portion of the circuit provided by the liquid metal 16, such that when a breakdown potential is applied between an electrode 112 and any particular electrode 114, the breakdown or explosion will occur in the respective restrictive section 110 remote from the electrodes 112 and 114. The resulting highly expanding conductive gas formed in the respective restricted section 110 will force the liquid metal 16 against the elastic material wall 104 and rapidly expand the wall. The force of expansion of the wall 104 will then be transmitted through the acoustic matching liquid in the chamber 134 to also expand the elastic membrane 132 which is in contact with the body of water in which the transmitter 100 is immersed. As a result, an acoustic wave is generated in the body of water each time a breakdown potential is applied across the electrode 112 and any one of the electrodes 114.

The source 116 provides a breakdown potential on all of the capacitors 118. At the start of a cycle of operation, the trigger 130 starts firing the discharge tubes 126 one at a time at the desired frequency of transmission of the acoustic signals in the body of water. Each time a discharge tube 126 is fired, the potential built up on the respective capacitor 118 is drained off through the tube to provide a surge of current to the respective second electrode 114 and impose the breakdown potential across the respective electrode 114 and the electrode 112.

Assuming four of the secondary electrodes 114 are provided in the transmitter 100, the upper electrode 114 would be used to generate each fourth cycle of the acoustic signal being transmitted in the body of water. The trigger 130 would then be programmed to sequentially fire the discharge tubes 126 at the desired frequency for the signal transmitted into the surrounding body of water. After each breakdown or explosion, the resulting gas in the restricted section 110 of the chamber 106 will contract and be reconverted to liquid metal which will result in the contraction of the wall 104 and membrane 132 for another breakdown or explosion. Thus, the transmitter 100 will effectively generate and transmit an acoustic wave train in the surrounding body of water. Here again, the transmitter 100, except for the control circuit, will be towed or carried through the water by a vessel and may be used for transmitting acoustic signals in the body of water for any desired distance measuring operation.

From the foregoing, it will be apparent that the present invention provides an underwater transmitter of increased efficiency and utility. A transmitter constructed in accordance with this invention may be of moderate physical size and yet transmit substantially more energy into a body of water with substantial control over the characteristics of the transmitted signal. The transmitter of this invention may be economically constructed and operated, particularly in view of the fact that the transmitter need not be retrieved between cycles of operation.

Changes may be made in the construction and arrangement of the parts or elements of the various embodiments as disclosed herein without departing from the spirit and scope of the invention as defined in the following claims.

What is claimed is:
1. A sonic transmitter, comprising:
   a housing constructed of nonconductive material having an enclosed chamber therein, said housing having at least one wall thereof separating the chamber from the medium through which sound is to be transmitted formed of an elastic material;
   a pair of solid electrodes extending into said chamber in spaced relation from one another;
   a body of liquid metal in said chamber sized to contact both of said electrodes in at least one position of the housing and form a conductor between the electrodes;
   a source of electrical energy connected to said electrodes sized to impose sufficient potential across the electrodes to momentarily change the state of a portion of the body of liquid metal to a gas, whereby the elastic wall of the housing is forced outwardly to create a sonic wave in said medium; and wherein
      the housing comprises an elastic material hollow ball;
      one of said solid electrodes extends into a medial portion of the interior of the ball;
      the body of liquid metal only partially fills the ball and contacts a smaller area of said one solid electrode than the other solid electrode in one position of the ball; and wherein
      the remainder of the interior of ball is filled with a nonconductive liquid.

2. A sonic transmitter, comprising:
   a housing constructed of nonconductive material having an enclosed chamber therein, said housing having at least one wall thereof separating the chamber from the medium through which sound is to be transmitted formed of an elastic material;
   a pair of solid electrodes extending into said chamber in spaced relation from one another;
   a body of liquid metal in said chamber sized to contact both of said electrodes in at least one position of the housing and form a conductor between the electrodes;
   a source of electrical energy connected to said electrodes sized to impose sufficient potential across the electrodes to momentarily change the state of a portion of the body of liquid metal to a gas, whereby the elastic wall of the housing is forced outwardly to create a sonic wave in said medium; and wherein:
      the liquid metal fills the chamber when the elastic material wall is not expanded, and the cross-sectional area of the chamber is reduced at a location spaced from the solid electrodes, whereby the portion of the liquid metal changed to a gaseous state will be remote from both of the solid electrodes.

3. An underwater transmitter as defined in claim 2 wherein the liquid metal is mercury.

4. An underwater transmitter as defined in claim 2 wherein the liquid metal is Woods metal.

5. An underwater transmitter as defined in claim 2 wherein the liquid metal is a gallium alloy.

6. A sonic transmitter, comprising:
   a housing constructed of nonconductive material having an enclosed chamber therein, said housing having at least one wall thereof separating the chamber from the medium through which sound is to be transmitted formed of an elastic material;
   a pair of solid electrodes extending into said chamber in spaced relation from one another;
   a body of liquid metal in said chamber sized to contact both of said electrodes in at least one position of the housing and form a conductor between the electrodes;
   a source of electrical energy connected to said electrodes sized to impose sufficient potential across the electrodes to momentarily change the state of a portion of the body of liquid metal to a gas, whereby the elastic wall of the housing is forced outwardly to create a sonic wave in said medium; and wherein:
      said housing is elongated and said chamber extends throughout substantially the entire length thereof, one of the solid electrodes is positioned in one end of the chamber and the other solid electrode is positioned in the opposite end of the chamber, a portion of the chamber between the solid electrodes is reduced in cross-sectional area, and wherein the liquid metal fills the chamber when the elastic material wall of the housing is not expanded.

7. An underwater transmitter as defined in claim 6 wherein the elastic material wall is located at one end of the housing, and the portion of the housing surrounding the reduced cross-sectional area portion of the chamber is formed of a heat conductive but electrically insulating material.

8. An underwater transmitter as defined in claim 7 characterized further to include heat conducting fins around the portion of the housing surrounding the reduced cross-sectional area of the chamber.

9. An underwater transmitter as defined in claim 7 characterized further to include an extension on the housing extending from the elastic material wall opposite to the chamber;
an elastic material membrane sealed across the housing extension is spaced relation from the elastic material wall to form a secondary chamber on the side of the elastic material walls at the opposite ends thereof chamber; and
a liquid filling the second chamber having acoustic transmitting characteristics between the liquid metal and the water surrounding the housing.

10. An underwater transmitter, comprising:
a housing adapted to be immersed in a body of water and including:
a central tubular section of nonconducting, rigid material; and
elastic material walls at the opposite ends thereof forming a chamber extending through said central section;
a washer-shaped solid electrode secured between each end of said central section and the respective elastic material wall and axially aligned with the central section, the bore through each of the solid electrodes forming a portion of said chamber and the diameter thereof being larger than the diameter of the bore through said central section;
a conductive, liquid metal filling said chamber when the elastic material walls are not expanded; and
a source of electrical energy connected to said solid electrodes sized to impose sufficient potential across the solid electrodes to momentarially change a portion of the liquid metal within said central section to a gaseous state, whereby the elastic material walls are expanded outwardly and sonic waves are generated in the water surrounding the housing.

11. An underwater transmitter as defined in claim 10 wherein said housing is extended outwardly of each of the elastic material walls to form a secondary chamber at each end of the housing communicating with the side of the respective elastic material wall opposite to the first-mentioned chamber;
and characterized further to include:
an elastic material membrane sealed across each end of the housing completing the enclosure of the respective secondary chamber; and
an acoustic matching liquid filling each of secondary chambers.

12. An underwater transmitter, comprising:
a housing adapted to be immersed in a body of water having an enclosed chamber therein and an elastic material wall at one end of the chamber;
a first solid electrode extending into the chamber;
a plurality of second solid electrodes extending into the chamber in spaced relation from one another and the first electrode;
a body of liquid metal filling the chamber and contacting each of the electrodes to form a conductor between said first electrode and each of said second electrodes when the elastic material wall is not expanded; and
means for cyclically imposing potentials across the first electrode and each of the second electrodes of sufficient magnitudes to repeatedly change the state of portions of the liquid metal to gas, whereby the elastic material wall is cyclically expanded and generates a train of acoustic waves in the water surrounding the housing.

13. An underwater transmitter as defined in claim 12 wherein the housing is shaped to reduce the cross-sectional area of said chamber between said first electrode and each of said second electrodes to control the locations where the liquid metal is changed to a gaseous state.

References Cited
UNITED STATES PATENTS

| | | | |
|---|---|---|---|
| 921,013 | 5/1909 | Shoemaker | 340—12 |
| 2,167,536 | 7/1939 | Suits | 340—12 |
| 2,660,556 | 11/1953 | Butler | 340—12 |
| 2,884,375 | 4/1959 | Seelig et al. | 340—12 |
| 2,946,217 | 7/1960 | Fruengel | 340—12 |

RODNEY D. BENNETT, JR., *Primary Examiner.*

BRIAN L. RIBANDO, *Assistant Examiner.*

UNITED STATES PATENT OFFICE
CERTIFICATE OF CORRECTION

Patent No. 3,428,940                                            February 18, 1969

William B. Huckabay

It is certified that error appears in the above identified patent and that said Letters Patent are hereby corrected as shown below:

Column 2, line 12, "is" should read -- in --. Column 6, line 21, "contact" should read -- contract --. Column 9, line 15, "is" should read -- in --; lines 17 and 18, "at the opposite end thereof chamber" should read -- opposite to the first-mentioned chamber; and --.

Signed and sealed this 24th day of March 1970.

(SEAL)
Attest:

Edward M. Fletcher, Jr.                                  WILLIAM E. SCHUYLER, JR.

Attesting Officer                                                    Commissioner of Patents